United States Patent

[11] 3,594,730

[72] Inventor Wing N. Toy
Glen Ellyn, Ill.
[21] Appl No 735,297
[22] Filed June 7, 1968
[45] Patented July 20, 1971
[73] Assignee Bell Telephone Laboratories, Incorporated
Murray Hill, Berkeley Heights, N.J.

[54] INFORMATION PROCESSING SYSTEM INCLUDING MULTIPLE FUNCTION TRANSLATORS
11 Claims, 10 Drawing Figs.

[52] U.S. Cl. .......... 340/172.5, 179/18, 340/347
[51] Int. Cl. .......... G06f 5/00
[50] Field of Search .......... 340/172.5, 347; 179/18

[56] References Cited
UNITED STATES PATENTS

| | | | |
|---|---|---|---|
| 3,229,275 | 1/1966 | Warman et al. | 340/347 |
| 3,235,664 | 2/1966 | Muroga et al. | 340/347 |
| 3,344,410 | 9/1967 | Collins et al. | 340/172.5 |
| 3,348,205 | 10/1967 | Lee | 340/172.5 |
| 3,354,450 | 11/1967 | Carthew et al. | 340/347 |
| 3,372,376 | 3/1968 | Helm | 340/172.5 |
| 3,421,151 | 1/1969 | Wong et al. | 340/172.5 |
| 3,099,720 | 7/1963 | Gotthardt | 179/18 TR |

*Primary Examiner*—Paul J. Henon
*Assistant Examiner*—Mark Edward Nusbaum
*Attorneys*—R. J. Guenther and Kenneth B. Hamlin

ABSTRACT: An information processing system characterized by modularity of design and good maintenance features includes a plurality of one-out-of-N translators each of which includes double-output detection circuitry. Some of the translators are operated in a conventional manner to convert a multidigit input word into energization of one particular one of N output lines emanating therefrom. Others of the translators are supplied with periodic clock signals, steady-state reference signals and instruction signals. In response to such a set of signals, these other translators are operated in a unique manner to provide a specified plurality of sequential control signals which are applied to a matrix array to cause the readout therefrom of a corresponding plurality of stored words.

INVENTOR
W. N. TOY
BY
Lucian C. Canepa
ATTORNEY

INFORMATION PROCESSING SYSTEM INCLUDING MULTIPLE FUNCTION TRANSLATORS

This invention relates to the processing of information signals and more particularly to an information processing system that includes multiple-function translators.

BACKGROUND OF THE INVENTION

In recent years considerable effort has been directed to the task of designing electronic systems in integrated circuit form. The advantages of integrating such systems on a large scale basis are well known. These advantages include considerations of cost, space, speed and power dissipation.

The advantages of large-scale integration of a complex system can be significantly enhanced if the number of different basic constituent circuits out of which the system is formed can be kept to a relatively low figure. In addition, the efficiency and reliability of such an integrated system can be greatly increased if effective trouble detection techniques can be easily embodied therein.

SUMMARY OF THE INVENTION

An object of the present invention is an improved information processing system.

More specifically, an object of this invention is an information processing system having a relatively few basic constituent circuits.

Another object of the present invention is an improved and simplified information processing system adapted to be implemented in integrated circuit form and characterized by modularity of design and good maintenance features.

Briefly, these and other objects of the present invention are realized in a specific illustrative system embodiment thereof that comprises a plurality of one-out-of-N translators of the type disclosed in my copending application, Ser. No. 457,406, filed May 20, 1965, now U.S. Pat. No. 3,428,945, issued Feb. 18, 1969. Each such translator includes associated error-detection circuitry and is therefore equipped to impart error-control capabilities to the overall system. In addition, in accordance with the principles of this invention, clock signals are applied to such a translator to cause it to generate any desired number of sequential control signals. Furthermore, in the illustrative system, such translators are adapted to perform logic operations.

An entire information processing system can be constructed by interconnecting a plurality of identically configured (but differently operated one-out-of-N translators with a small number of other different types of basic components. When implemented in integrated circuit form, the resultant system exhibits an advantageous simplicity and modularity of design.

A feature of the present invention is that a one-out-of-N translator having error-control capabilities is driven in a unique way by clock signals to generate a plurality of sequential control signals.

Another feature of this invention is that such a translator is driven by clock signals to provide one of several control signal sequences depending respectively on which one of several sets of enabling signals is applied to the translator.

A further feature of the present invention is that such translators are operated in an overall system to provide a check both on the occurrence of double outputs therefrom and on the presence of certain clock signals intended to be applied thereto.

BRIEF DESCRIPTION OF THE DRAWING

A complete understanding of the present invention and of the above and other features, variations and advantages thereof may be gained from a consideration of the following detailed description of an illustrative embodiment thereof presented hereinbelow in conjunction with the accompanying drawing, in which.

DETAILED DESCRIPTION

Figure 1:
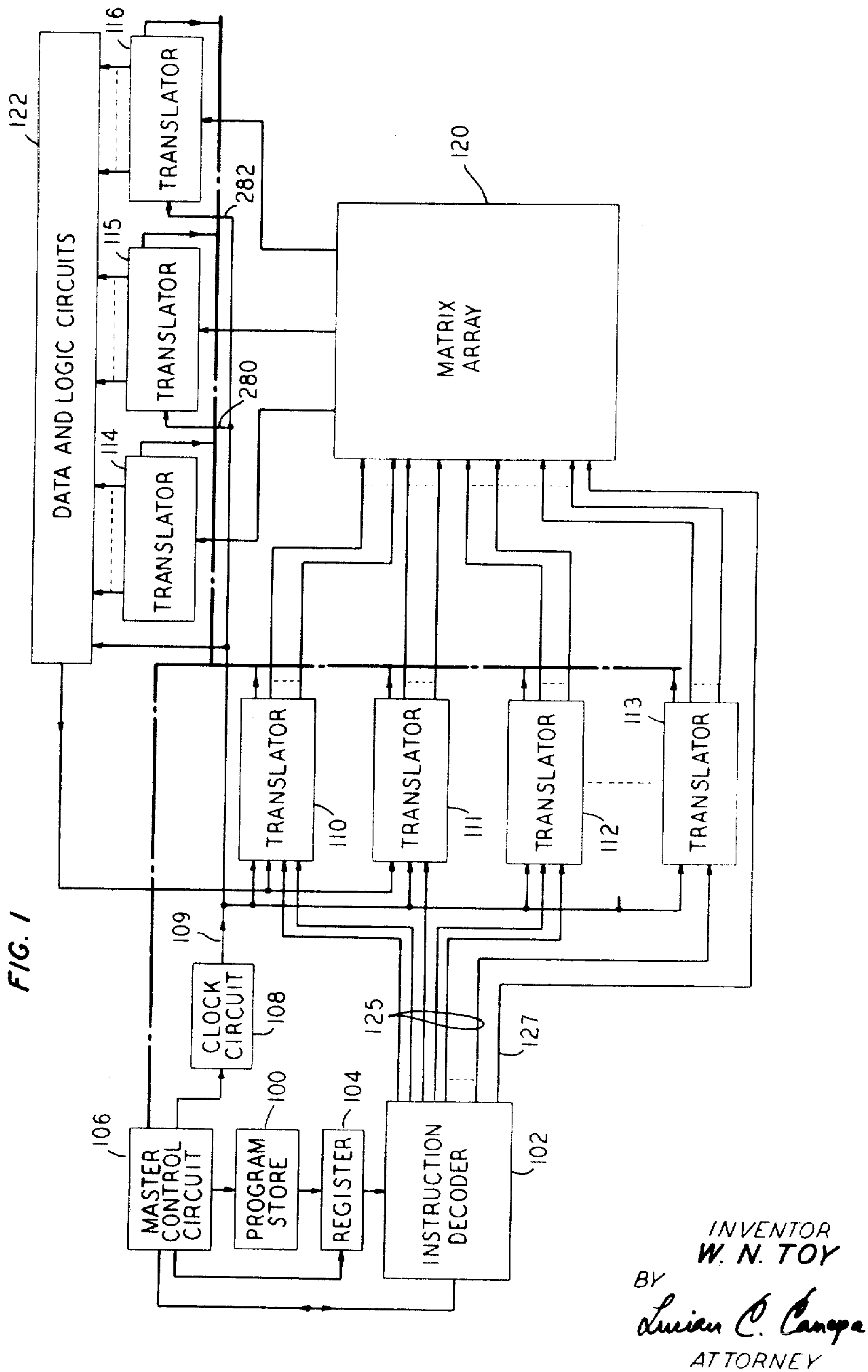
FIG. 1 is a block diagram of an information processing system made in accordance with the principles of the present invention.

The specific illustrative information processing system shown in FIG. 1 constitutes a general-purpose stored program processor. In the depicted system, digital words representative of instructions to be decoded and executed are contained in a program store 100 which, for example, may be of the type described in "No. 1 ESS Program Store" by C. F. Ault et al., pages 2097—2146, *The Bell System Technical Journal*(hereinafter *BSTJ*), Part I, Sept. 1964. In a conventional and well understood manner, selected ones of these instructions are applied one at a time from the store 100 to an instruction decoder 102 via a buffer register 104. (The instruction decoder 102 may comprise a binary to one-out-of-N translator of the type described in this application. In addition, the register 104 is a conventional buffer unit which may be of the type described on page 2073 of "No. 1 ESS Logic Circuits and Their Application to the Design of the Central Control" (hereinafter "Logic Circuits") by W. B. Cagle et ., *BSTJ*, Part I, Sept. 1964. ) The selection of and sequencing through the instructions contained in the store 100 is controlled by a master control circuit 106 that is coupled to the store 100. The circuit 106 also controls the operation of a clock circuit 108 which is adapted to apply clock or timing signals via a bus 109 to various indicated ones of a plurality of one-out-of-N translators 110 through 116. The master control circuit 106 and the clock circuit 108 may be constructed in accordance with the description contained on pages 1908—1920 (see FIG. 35 in particular) of "Organization of the No. 1 ESS Central Processor" by J. A. Harr et al., *BSTJ*, Part I, Sept. 1964 and on pages 2055—2095 of the aforecited "Logic Circuits". Herein for illustrative purposes each of these translators will be assumed to be a one-out-of-32 translator of the type shown in FIG. 3A of the above-identified copending application. (This type of translator will be described in detail below.) In such a translator each different one of 32 possible 5-digit binary input words is effective to select a different one of 32 output lines extending from the translator.

The system of FIG. 1 also includes a standard coordinate matrix array 120 which includes a multiplicity of horizontal input lines and a plurality, for example 15, vertical output lines. Illustratively, the array 120 includes a transistor crosspoint unit positioned at preselected ones of the intersections formed by the aforementioned horizontal and vertical lines. Accordingly, energization of a particular one of the horizontal input lines is effective to cause a unique 15-digit word to appear in parallel on the output lines. It is apparent, therefore, that the array 120 functions as a converter in which energization of a particular horizontal input line causes a corresponding 15-digit output word to be read out therefrom. Alternatively, the array 120 may be of the diode type described in U.S. Pat. No. 3,245,051, issued Apr. 5, 1966 to J. H. Robb, or of the type described in U.S. Pat. No. 3,383,663, issued May 14, 1968 to C. A. M. David.

Additionally, the FIG. 1 system includes conventional data and logic circuits (represented by block 122) which respond to various combinations of control signals from the translators 114 through 116 to perform therein various prescribed data manipulation and logic operations. One particular illustrative data manipulation operation that the circuits 122 are adapted to perform in response to output signals from the translators 114 through 116 involves (1) transferring data from a first designated register to a bus, (2) clearing a second designated register, and (3) then transferring the data from the bus to the second register. (The first and second registers and the data bus are assumed to be contained within the block 122.) Alternatively, the unit 122 may include plural processors whose sequence of operation is to be controlled in accordance with output signals from the translators 114 through 116.

In actual operation the instruction decoder 102 of FIG. 1 responds to an instruction word applied thereto from the register 104 to energize a specified one of a multiplicity of output lines 125 emanating therefrom. Some of these output lines (represented by bus 127) extend directly to respective inputs of the matrix array 120. If one of these directly extending output lines is selected by the decoder 102, a resultant 15-digit word uniquely representative thereof is applied from the array 120 to the translators 114 through 116.

Some of the instructions decoded by the unit 102 specify in effect a plurality of sequential operations and therefore require for their execution that a series of control signals be applied to the matrix array 120. Each instruction of this type can be considered to designate a series of so-called micro-operations. Decoding of each such plural-operation instruction results in the selection of one of the output lines 125 that does not extend directly to the array 120. Instead, in accordance with the principles of the present invention, such lines are connected to the array 120 via the translators 110 through 113. Additionally, decoding of such an instruction results in the decoder 102 signaling the master control circuit 106 to trigger the circuit 108 to apply specified clock signals to the translators 110 through 113. In response to such clock signals and instruction signals from the decoder 102, a particular one of the translators 110 through 113 is operated to generate a sequence of 2, 4, 8 or more control signals which are applied to respective input lines of the array 120 to cause a readout therefrom of a corresponding number of 15-digit output words. In this way energization of a single output line emanating from the decoder 102 is converted or expanded into a plurality of operation-controlling outputs from the matrix array 120.

Figure 2A:
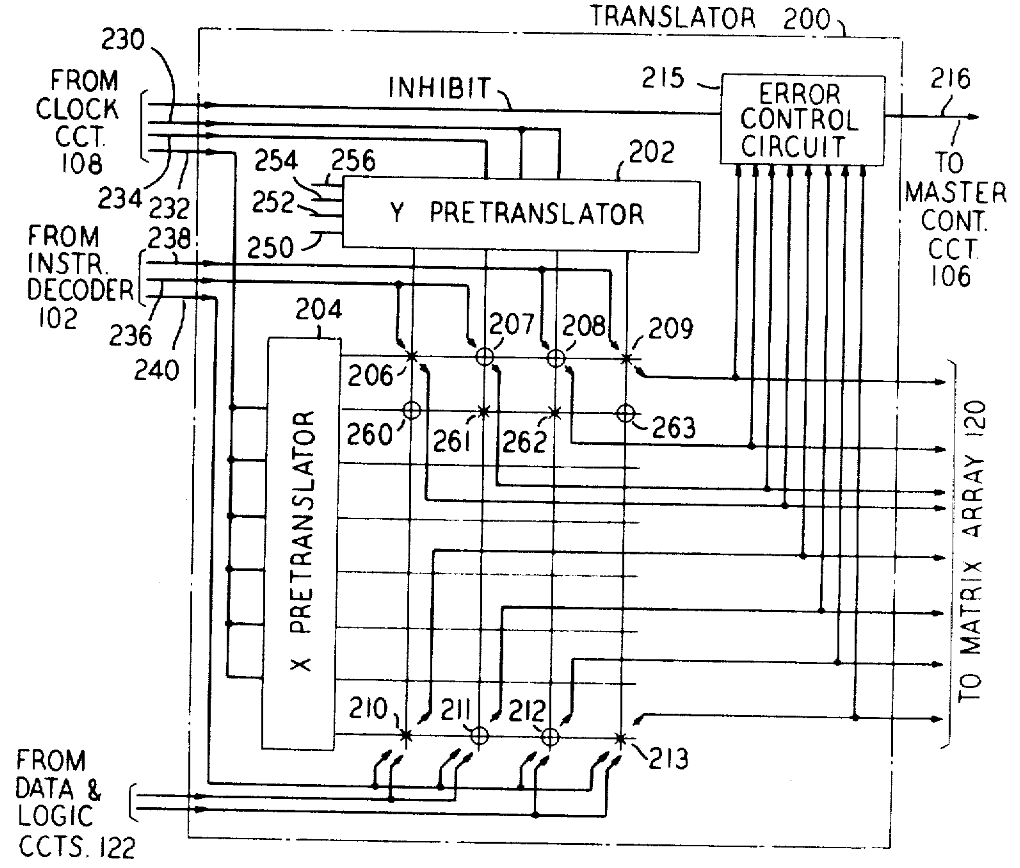
FIG. 2A shows a one-out-of-N translator of the type included in the FIG. 1 system.

As a basis for understanding the particular unique manner in which the translators depicted in FIG. 1 are operated, reference is made to the illustrative translator configuration shown in FIG. 2A. The translator 200 shown therein includes Y and X pretranslators 202 and 204 whose particular arrangements will be described below in connection with FIGS. 2C and 2D. Four vertical output lines emanate from the Y pretranslator 202 and eight horizontal output lines extend from the X pretranslator 204. These leads intersect to form a coordinate matrix having 32 intersections at each of which is connected a cross-point unit. The four cross-points 206 through 209 in the topmost row of the matrix are represented by X and O symbols, as are the four cross-points 260 through 263 included in the second row and the four cross-points 210 through 213 included in the last row.

Advantageously, the output leads of the X-designated cross-point units shown in FIG. 2A extend to the respective inputs of one OR circuit (not shown) included in an error control circuit 215, and the output leads of the O-designated cross-points extend to a second OR circuit (not shown) in the circuit 215. Illustratively, the overall arrangement of the circuit 215 corresponds to that of the error detecting circuit 300 and its associated indicator 385 shown in FIG. 3A of the above-cited application. In particular, the above-specified OR circuits correspond, for example, to the circuits 375 and 380 of FIG. 3A. Thus, if each cross-point unit of a set including at least one O-designated unit and one X-designated unit simultaneously provide output selection signals, the circuit 215 will indicate by a signal an output lead 216 that a malfunction (double-output condition) has occurred.

Figure 2B:
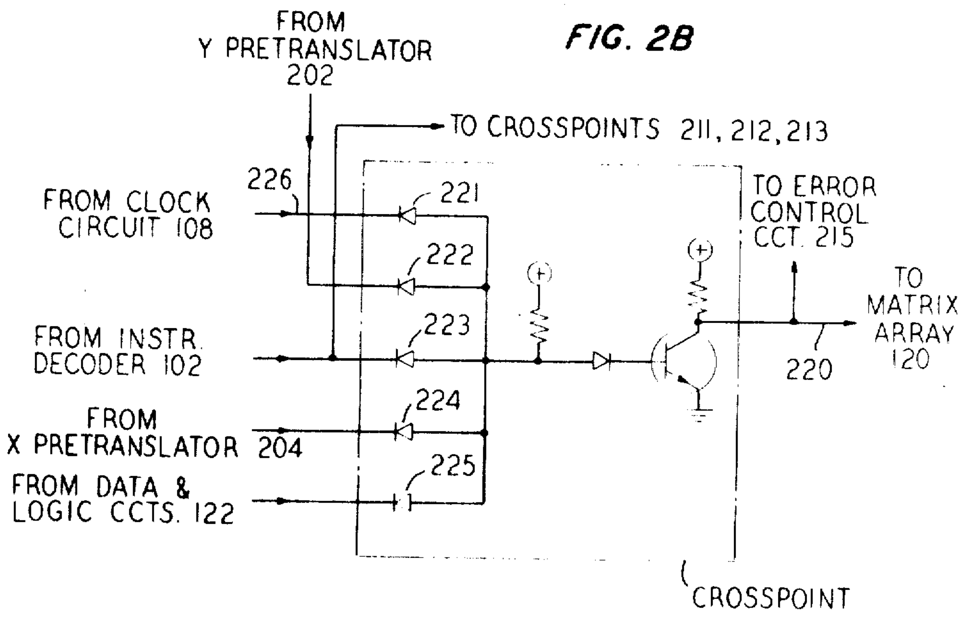
FIG. 2B illustrates the configuration of a crosspoint unit included in the translator of FIG. 2A.

Each of the cross-point units included in the translator of FIG. 2A may, for example, comprise a logic circuit of the type shown in FIG. 2B. This circuit, which is a conventional NAND gate, is adapted to provide a relatively high positive potential on output lead 220 if at least one of the signals applied to the cathodes of input diodes 221 through 225 thereof is a relatively low near-ground potential. On the other hand, if all of the input signals comprise relatively high positive potentials, the output signal of the depicted cross-point is a near-ground potential. Herein a cross-point will be considered to have been selected if the potential of its output lead is relatively low.

As shown in FIG. 2B, the inputs to the illustrated cross-point unit (which may, for example, be considered to correspond to the cross-point 210 of FIG. 2A) are derived from the Y and X pretranslators 202 and 204, the instruction decoder 102 and the data and logic circuits 122. The output lead of the specified cross-point unit is connected to the error control circuit 215 and the matrix array 120.

In addition, another input line 226 is shown in FIG. 2B. As specified later hereinbelow in connection with the description of the translators 115 and 116, clock signals applied to this line from the circuit 108 may be utilized to sequentially enable a plurality of translators.

Figure 2C:
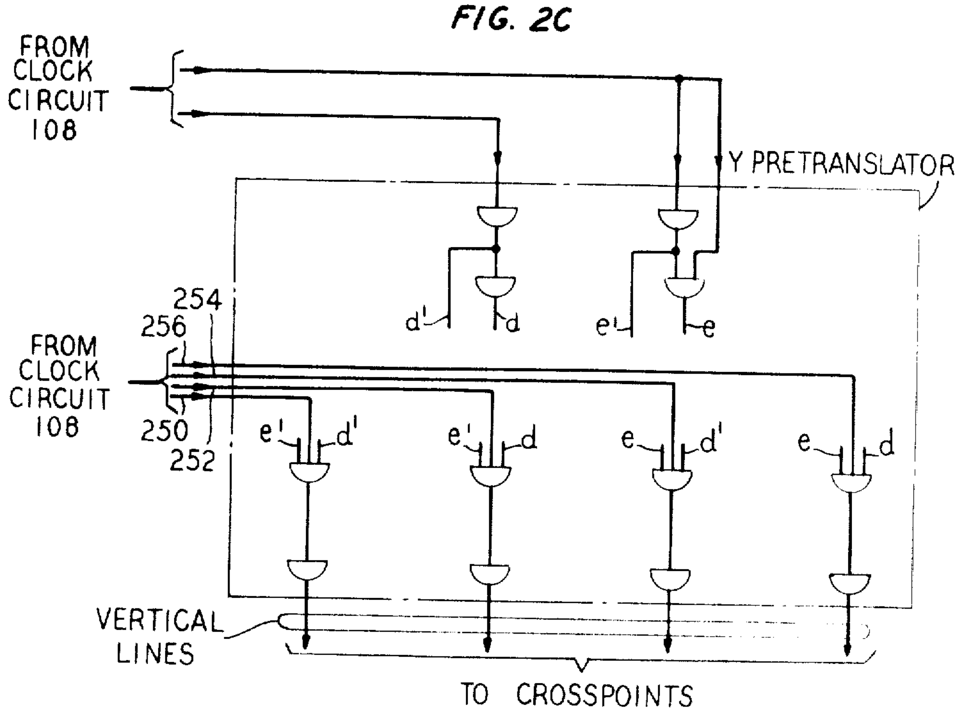
FIGS. 2C and 2D respectively depict the arrangement of the Y and X pretranslators included in the FIG. 2A translator.
Figure 2D:
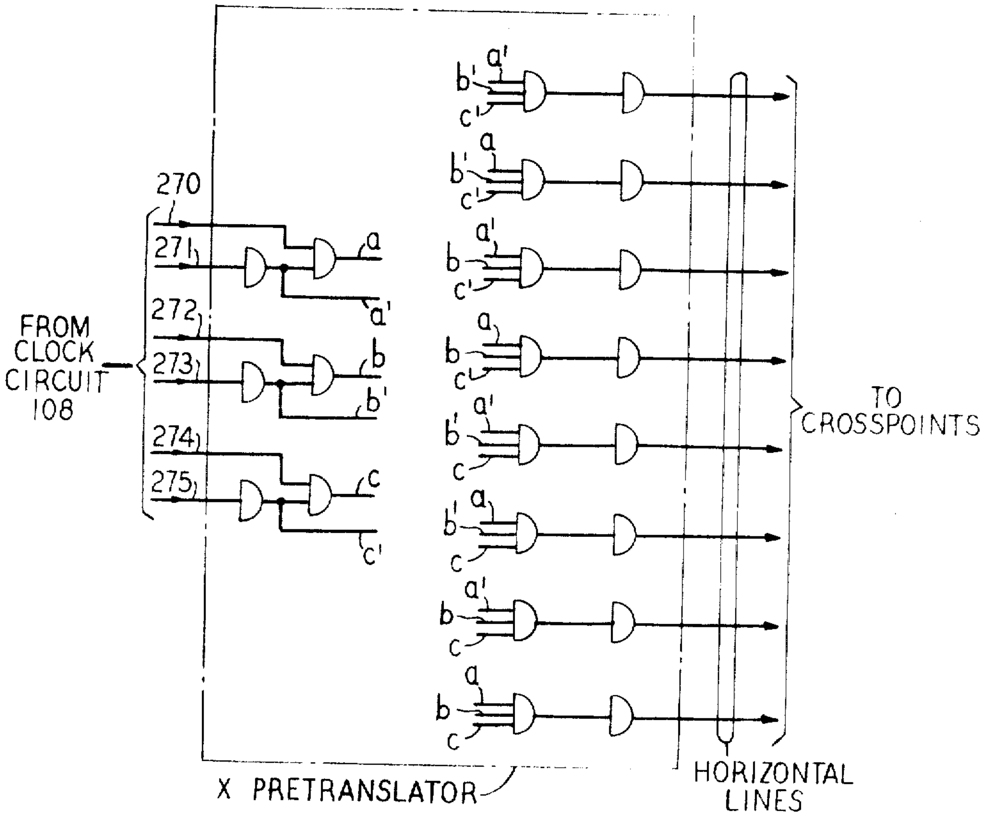

FIGS. 2C and 2D respectively show illustrative implementations for the Y and X pretranslators 202 and 204 of FIG. 2A. As specified in my aforecited copending application, these pretranslators are normally adapted to respond to a 5-digit input word to select a particular indicated one of a plurality of associated cross-point units.

Each of the logic symbols employed in FIGS. 2C and 2D represents a NAND circuit such as that depicted in FIG. 2B. In order not to unduly complicate the showings of FIGS. 2C and 2D, various interconnections therein have not actually been drawn in, but instead have been clearly indicated by labeling the leads that are shown. It is to be understood that correspondingly designated leads in those figures are in fact intended to be electrically connected together.

Figure 2E:
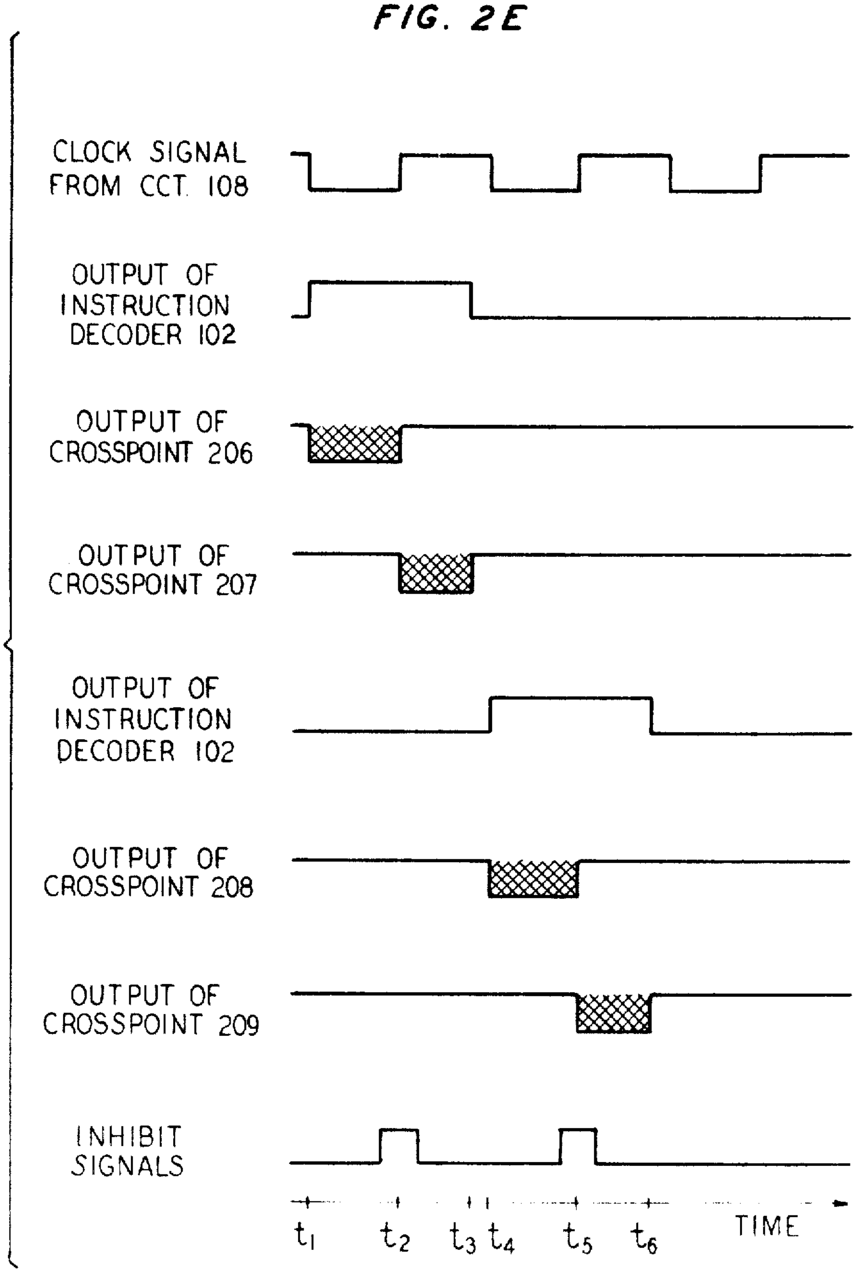
FIGS. 2E, 2F and 3 through 5 depict various waveforms that are helpful in understanding the mode of operation of the various arrangements shown in the drawing.

The mode of operation of the FIG. 2A translator is providing, for example, two sequential control signals in response to a single instruction signal from the decoder 102 and appropriate clock signals from the circuit 108 can be understood from a consideration of FIGS. 2A and 2E. (For such operation the four leads shown in FIG. 2A extending into the left end of the Y pretranslator 202 need not be connected to any circuitry external to the translator. Alternatively, these leads may be extended to the clock circuit 108 wherein relatively high positive potentials are respectively applied thereto.) Assume that the clock circuit 108 applies ground signals to the input leads 230 and 232 of the translator of FIG. 2A and, in addition, applies a clock signal (whose waveform is shown in the first row of FIG. 2E) to the input line 234 thereof. Furthermore, assume that the instruction decoder 102 respectively supplies the signals shown in the second and fifth rows of FIG. 2E to the input leads 236 and 238 of the FIG. 2A translator. (It is noted that selection of a particular one of the output leads emanating from the decoder 102 is manifested by the presence of a relatively high potential thereon.)

In response to the application of the above specified signals to the translator of FIG. 2A, there appears on each of the horizontal lines emanating from the X pretranslator 204 a relatively high potential signal. (This may be easily verified by tracing through the configuration of FIG. 2D.) Similarly, it is apparent that the signals appearing on the four vertical lines emanating from the Y pretranslator 202 of FIG. 2A are respectively from left to right: high, low, high and low. Moreover, the instruction signals (from the decoder 102) respectively applied to the cross-point units 206 through 209 of FIG. 2A during the time interval designated $t_1$ through $t_2$ in FIG. 2E are high, high, low and low. Hence, it is evident that only the cross-point unit 206 has no low signal applied thereto. As a result, only the cross-point unit 206 provides a relatively low output signal during the specified time interval. This output signal (cross-hatched for emphasis) is indicated in the third row of FIG. 2E.

Subsequently, during the time interval $t_2$ through $t_3$ (FIG. 2E) the four vertical lines shown in FIG. 2A have, from left to right, low, high, low and high potentials respectively applied thereto by the Y pretranslator 202. And, since only the cross-point unit 207 of the set 207 and 209 has a high instruction signal applied thereto during the interval $t_2$ through $t_3$, only the unit 207 provides a relatively low output signal (see fourth row of FIG. 2E) during that interval.

During the time interval designated $t_4$ through $t_6$ in FIG. 2E another instruction signal (shown in the fifth row thereof) plus the periodic clock signal shown in the first row plus the aforementioned ground condition are applied to the illustrative translator shown in FIG. 2A. As a consequence thereof, the translator provides at the outputs of the cross-point units 208 and 209 the cross-hatched relatively low signals represented in the sixth and seventh rows of FIG. 2E.

Thus, it has been shown that the application of a periodic clock signal and a steady-state ground signal, together with a single instruction signal from the decoder 102, is effective to provide at the output of the FIG. 2A translator two sequential control signals during the existence of each single instruction signal. In turn, these control signals are applied to different input lines of the matrix array 120 (FIG. 1) to cause two 15-digit words to be read out of the array 120 in sequence.

The output lines emanating from the cross-point units 206 through 209 of FIG. 2A are also connected to the error control circuit 215. Hence, the undesired simultaneous occurrence of relatively low outputs from O- and X-designated cross-point units is detected by the circuit 215. An appropriate indication thereof appears on the line 216 which may, for example, extend to the master control circuit 106 of FIG. 1. In turn, the circuit 106 may energize an alarm or otherwise signal the occurrence of an error in the system.

At time $t_2$ (FIG. 2E) the output of the cross-point unit 206 undergoes a transition from a low to a high value, and the output of the unit 207 goes from high to low. To eliminate the possibility that the error control circuit 215 will provide a false error detection during these transitions, it is advantageous to inhibit the operation of the circuit 215 during an interval that extends slightly before and after $t_2$. A similar inhibiting action is advantageously arranged to occur about $t_5$. Such inhibiting signals, supplied by the clock circuit 108 under control of the master circuit 106, are represented in the last row of FIG. 2E.

Figure 2F:
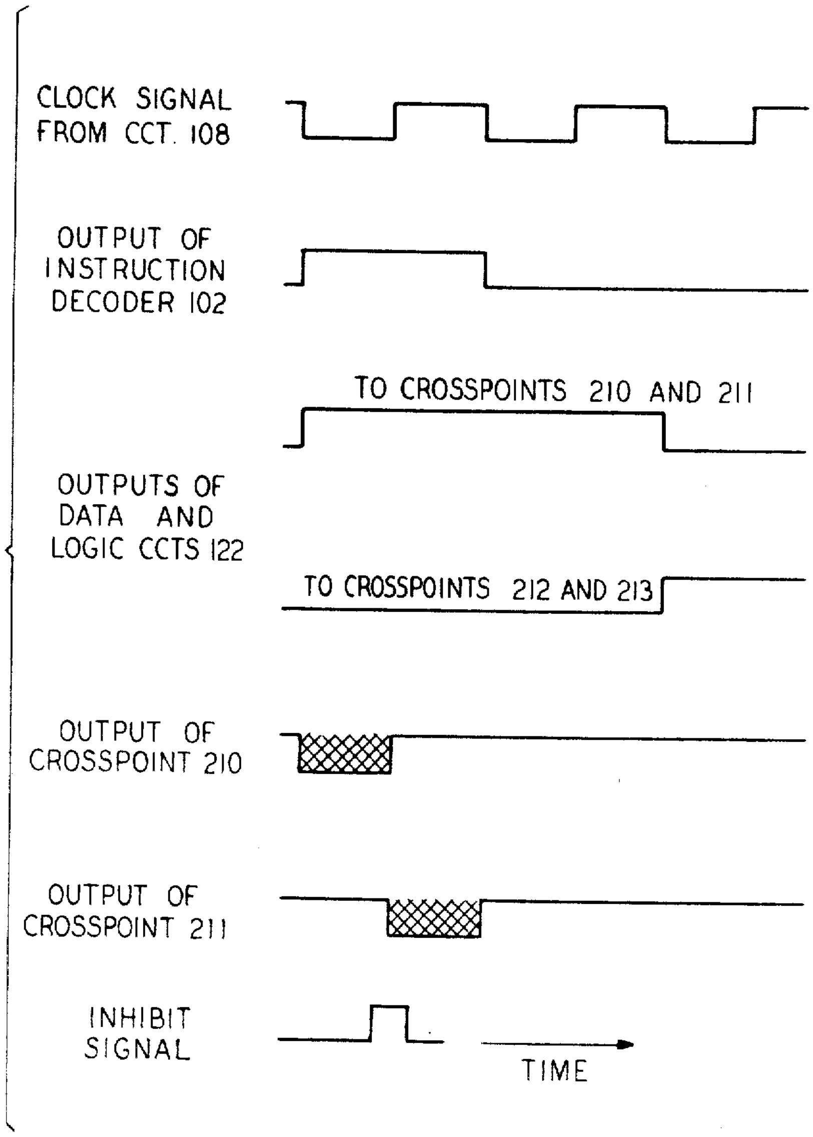

The translator 200 shown in FIG. 2A is also adapted to perform logic operations under the control of conditional signals applied thereto from the data and logic circuits 122 of FIG. 1. By way of illustration, the bottom four cross-point units 210 through 213 of the translator 200 are arranged to carry out this type of operation. Specifically, in this mode of operation the two pairs of cross-points comprising the units 210—211, and 212—213, are respectively supplied with complementary signals from the circuits 122. At the same time, an instruction signal from the decoder 102 is applied via a lead 240 to all the units 210 through 213. In addition, as before, ground signals are applied to the leads 230 and 232, and a clock signal of the form shown in the first row of FIG. 2F is applied to the lead 234. More specifically, an instruction signal (shown in the second row of FIG. 2F) is applied to the lead 240. Moreover, the signal represented in the third row of FIG. 2F is applied from the circuits 122 to the cross-points 210 and 211, and the signal shown in the fourth row thereof is applied from the circuits 122 to the cross-points 212 and 213. As a result of these particular input conditions, the cross-points 210 and 211 are controlled to provide two sequential control signals during the time interval in which the noted instruction signal is maintained at its relatively positive level. These control signals are represented in the fifth and sixth rows of FIG. 2F. During this time interval neither one of the cross-points 212 and 213 provides a relatively low output signal because of the low signal (fourth row of FIG. 2F) applied thereto from the circuits 122.

The conditional operation described above can easily be modified to cause the cross-points 212 and 213 to provide the two above-mentioned sequential control signals and to block the cross-points 210 and 211 from providing such signals. This modified operation is achieved simply by interchanging the signals indicated in the third and fourth rows of FIG. 2F.

The various output signals provided by the cross-points 210 through 213 are applied to the matrix array 120 to serve as row selection signals therefor. These output signals are also applied to the error control circuit 215 wherein a check for double outputs is carried out. To ensure against false double-output indications, it is advantageous, as before, to apply an inhibit signal (see last row of FIG. 2F) to the circuit 215 during a time period in which both cross-point output signals are undergoing transitions.

Figure 3:
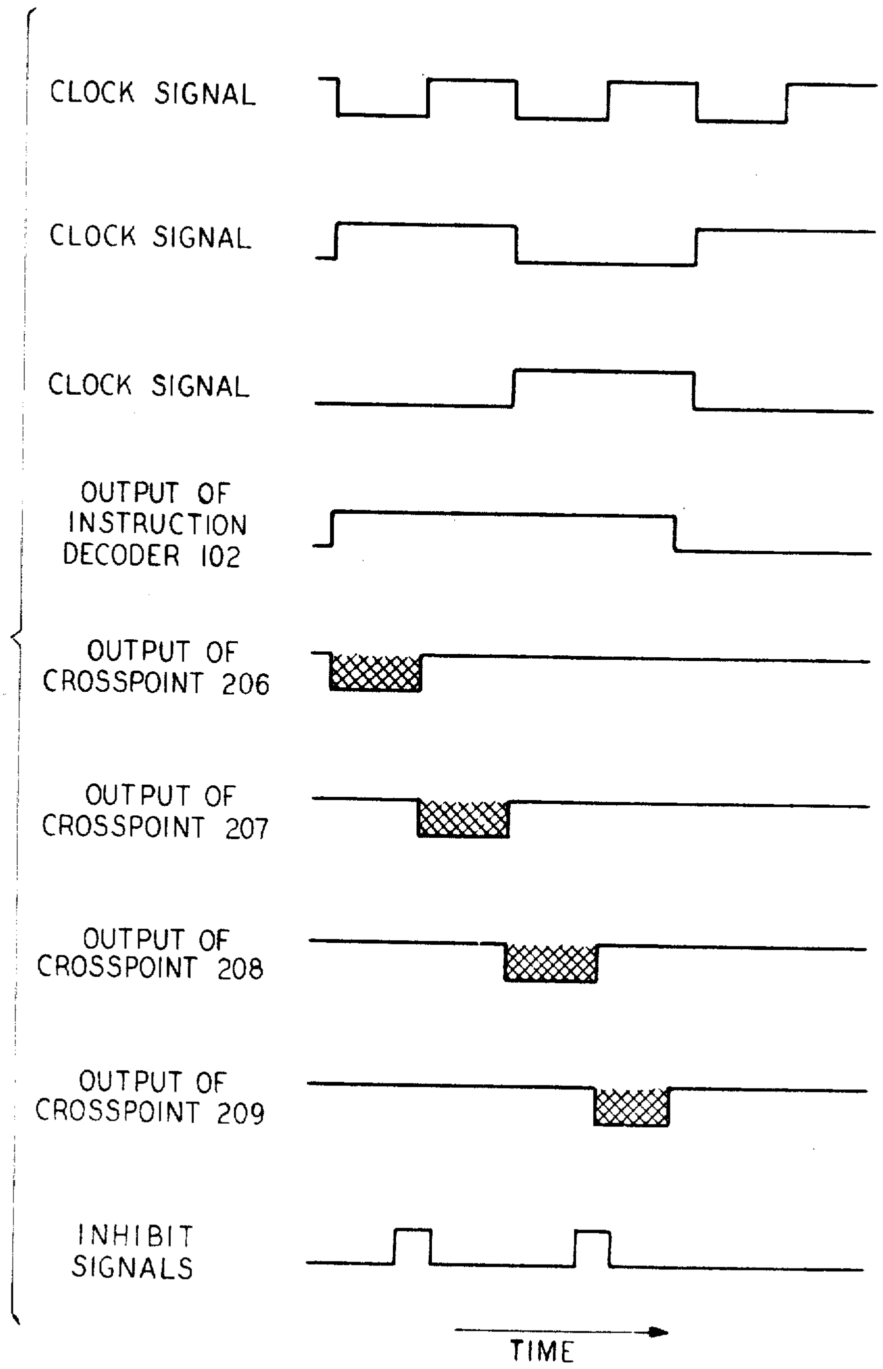
Figure 4:
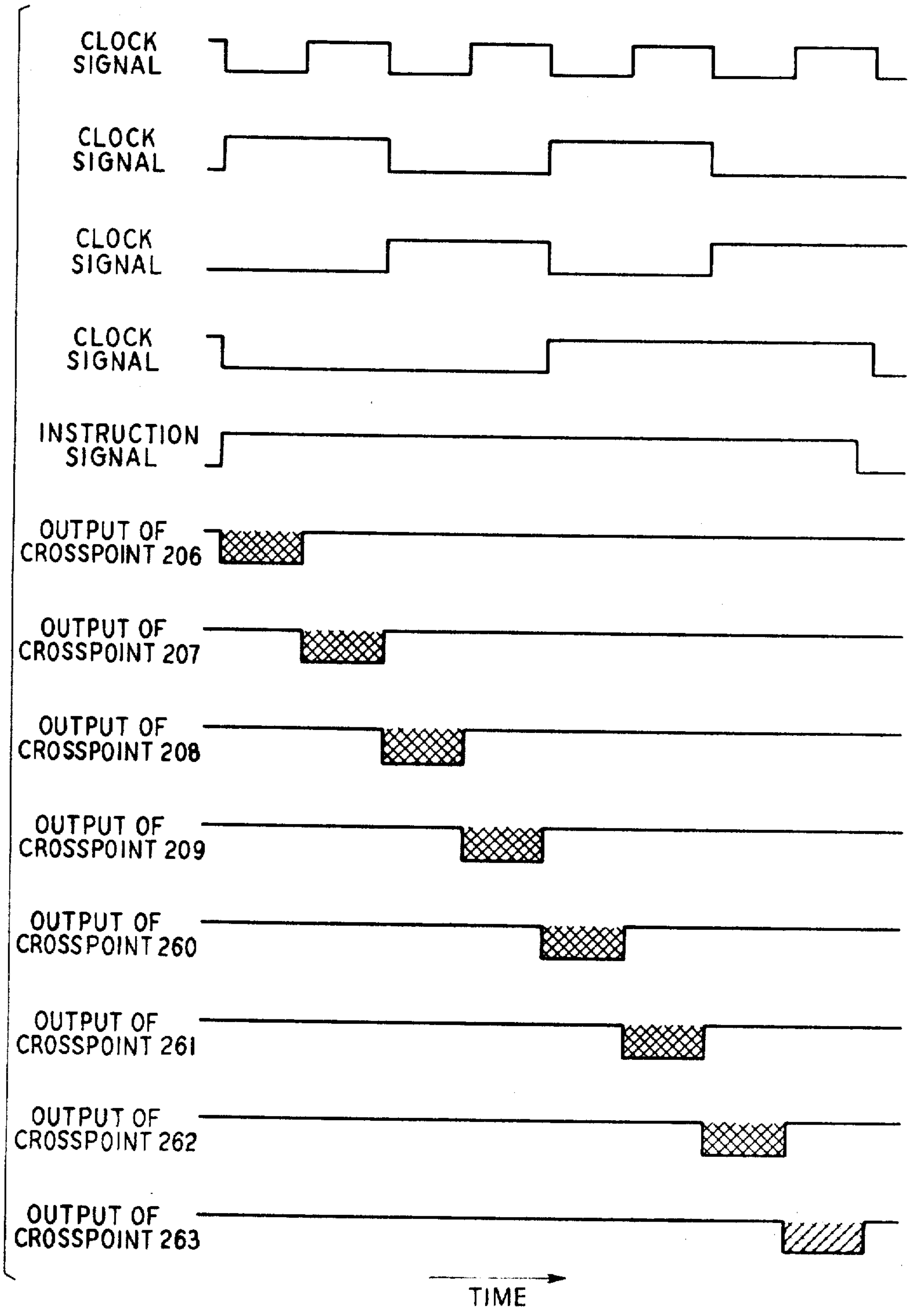

In accordance with the principles of the present invention the translator 200 shown in FIG. 2A is also capable of being operated to provide four or more sequential control signals during the occurrence of a single positive instruction signal. FIGS. 3 and 4 represent two illustrative modes of operation in which the translator 200 respectively provides four and eight sequential control signals.

The operation represented in FIG. 3 is realized by (1) (2) ground signals to the leads 230 and 232 of the translator 200, (2) applying the clock signal shown in the first row of FIG. 3 to the lead 234, (3) applying the clock signal shown in the second row of FIG. 3 to the input leads 250 and 252 of the Y pretranslator 202 (which leads and their specific manner of interconnection with the NAND gates in the pretranslator 202 are depicted in FIG. 2C), (4) applying the clock signal shown in the third row of FIG. 3 to the Y pretranslator input leads 254 and 256 (shown in FIGS. 2A and 2C), and (5) applying the instruction signal shown in the fourth row of FIG. 3 to each of the cross-points 206 through 209 (via the leads 236 and 238).

The operation represented in FIG. 4 is achieved in the following manner: (1) ground signals are applied to the lead 230 (FIG. 2A) that extends to the Y pretranslator 202 and also to the leads 272 through 275 (FIG. 2D) that extend to the X pretranslator 204, (2) the clock signal shown in the first row of FIG. 4 is applied to the lead 234 of FIG. 2A, (3) the clock signal shown in the second row of FIG. 4 is applied to the leads 250 and 252 (FIG. 2C), (4) the clock signal shown in the third row of FIG. 4 is applied to the leads 254 and 256 (FIG. 2C), (5) the clock signal shown in the fourth row of FIG. 4 is applied to the lead 271 of FIG. (6) (6) lead 270 is not connected to any signal source (alternatively, this lead may be connected to a relatively high potential source), and (7) the instruction signal shown in the fifth row of FIG. 4 is applied via a lead (not shown) to each of the cross-points 206 through 209 and 260 through 263.

In response to the various signals specified in the paragraph immediately above, the translator 200 of FIG. 2A is operated to provide eight sequential control signals, as depicted in the sixth through thirteenth rows of FIG. 4. In this way a single instruction signal from the decoder 102 is converted or expanded into eight row selection signals for the matrix array 120.

In view of the disclosure above and in accordance with the principles of the present invention, other sets of clock signals to be applied to a one-out-of-N translator to cause it to generate any desired number of sequential control signals may easily be devised.

For ease of discussion and so as not to unduly expand the number of figures included in the drawing, the translator of FIG. 2A has been considered herein as being capable of operating to provide 2, 4 or 8 sequential control signals. Such operation is entirely feasible. However, in one specific illustrative information processing system made in accordance with the principles of the present invention, each different one of the translators 110 through 113 shown in FIG. 1 is advantageously adapted to provide only one specified number of sequential output signals. Thus, for example, the translator 110 is operated to provide two sequential control signals, the translator 111 provides four such signals, the translator 112 generates eight such signals, and so forth.

Figure 5:
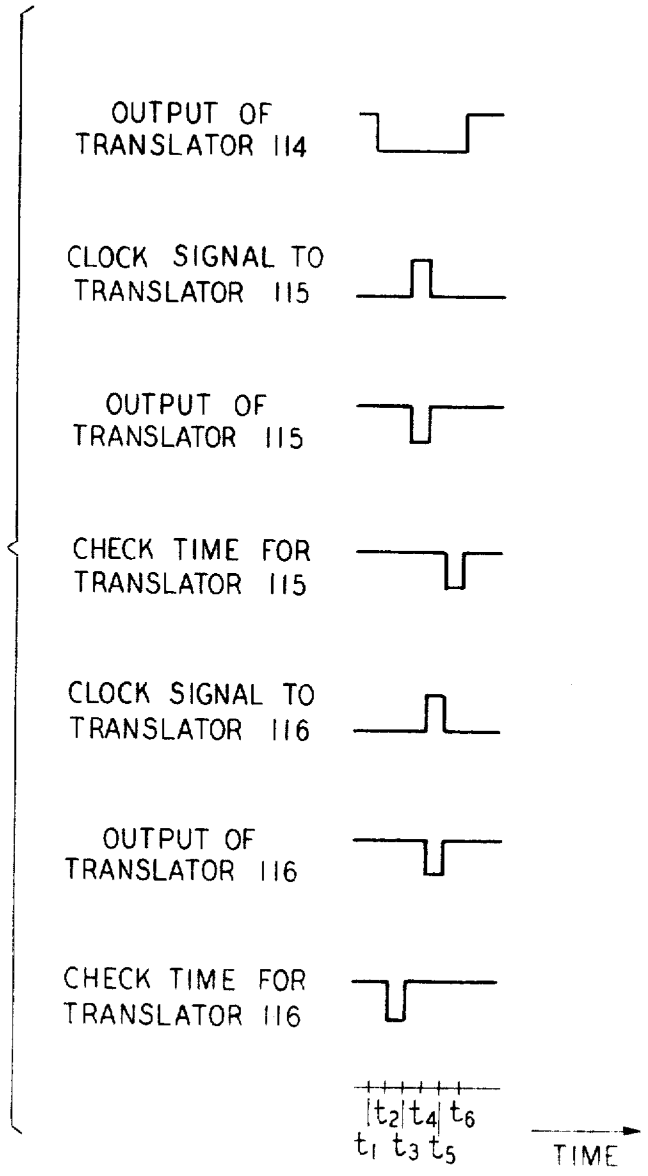

In carrying out data manipulation operations in the illustrative FIG. 1 system, it may be necessary to ensure that the signals read out of the matrix array 120 are gated through the translators 114 through 116 in a specified order. Thus, for example, in carrying out the above-mentioned first register-to-bus-to-second register manipulation, the operation of clearing the second register must be carried out before the data on the bus is gated to the second register. Illustratively, the necessary sequential control action may be achieved by applying timing or enabling signals to the translators 115 and 116 from the clock circuit 108 via leads 280 and 282. The nature of these enabling signals and of other signals employed to carry out the specified data manipulation operation operation is shown in FIG. 5.

Assume that the translator 114 (FIG. 1) is controlled by a 5-digit output word from the array 120 to provide a relatively low potential signal (first row of FIG. 5) on one of the leads extending between the translator 114 and the circuits 122. This signal is provided during the time interval designated $t_1$ through $t_8$ in FIG. 5. (In carrying out this conversion operation, the translator 114 operates in the conventional manner for which it was originally designed, which manner is described in detail in the aforementioned copending application.) In response to this signal from the translator 114, data is transferred from a first register in the block 122 to a data bus therein. During the initial portion of this interval (i.e., in the interval $t_1$ through $t_3$) low potential input clock signals are applied to each of the cross-points in the translators 115 and 116 (for example via the lead 226 shown in FIG. 2B) to hold all the outputs of the cross-points at their relatively high levels. These clock signals are represented in the second and fifth rows of FIG. 5 and the corresponding conditions of the translators 115 and 116 (in the interval $t_1$ through $t_3$) are respectively depicted thereunder.

Subsequently, in the interval designated $t_3$ through $t_4$ in FIG. 5, an enabling clock signal (shown in the second row of FIG. 5) is applied to the translator 115 whereby an output signal (third row) is then provided on a selected one of the output leads thereof. Similarly, a later clock signal in the interval $t_4$ through $t_8$ is effective to enable the translator 116 and to allow it to provide an output signal (sixth row) on a particular lead thereof that is determined by the nature of the input signals from the matrix array 120.

The error control circuitry included in each of the translators 114 through 116 is effective to check for the occurrence of erroneous double outputs from those translators. Such error information is applied, for example, to the master control circuit 106. In addition, the error control circuitry is advantageously utilized to periodically check whether or not the format of the above-described sequential enabling or clock signals applied to the translators 115 and 116 is correct. This is done by monitoring the aforementioned OR gates included in the error control circuitry of the translators.

More specifically, during the time interval designated $t_5$ through $t_6$ in FIG. 5, the OR gates in the error control circuitry included in the translators 114 and 115 are monitored by the master control circuit 106. This monitoring or checking interval is represented in the fourth row of FIG. 5. If the clock signal applied to the translator 115 is low (as it should be) during this interval, only the translator 114 will be supplying an output signal to the circuits 122. If, however, due to some malfunction in the system, the potential of the clock signal applied to the translator 115 is relatively high during the interval $t_5$ through $t_6$, both of the translators 114 and 115 will provide output signals during the noted checking interval. Such a double-output indication will be detected by the circuit 106. It is advantageous to choose the check interval to be $t_5$ through $t_6$ to avoid the possibility of overlap with the output of the translator 115 occurring during the interval $t_3$ through $t_4$.

Similarly, during the interval $t_2$ through $t_3$ indicated in FIG. 5, another checking operation takes place. This operation is effective to determine whether or not the translators 114 and 116 are providing simultaneous output signals.

Thus, in accordance with the principles of the present invention there has been described herein an information processing system that includes multiple-function translators. By applying various clock and enabling signals to the translators, and by selectively monitoring their output conditions during prescribed intervals, it has been shown that the translators can be operated in a unique manner to provide sequential control signals and, in addition, that the output status of a single translator or of several translators can easily be checked for double-output occurrences. Due to the inclusion of these multiple-function translators, the resultant system is characterized by modularity of design and good maintenance features.

It is to be understood that the above-described arrangements are only illustrative of the application of the principles of the present invention. In accordance with these principles numerous other arrangements may be devised by those skilled in the art without departing from the spirit and scope of the invention.

What I claim is:

1. In combination in an information processing system,
a plurality of one-out-of-N translators each including a plurality of output lines,
means for applying successive instruction signals to said translators, and
means for applying periodic clock signals and steady-state reference signals to said translators,
each of said translators including means responsive to said applied signals for generating and respectively applying to specified ones of the output lines thereof a plurality of sequential control signals during the time in which a single instruction signal of said successive instruction signals is applied to the translator.

2. A combination as in claim 1 further including a matrix array connected to said output lines to provide a multidigit output word from the array in response to each control signal applied thereto.

3. A combination as in claim 2 wherein each of said translators includes error control circuitry for detecting the generation by said translator of simultaneous control signals.

4. A combination as in claim 3 further including an additional plurality of one-out-of-N translators each including a plurality of output lines, each of said additional translators being responsive to a portion of each output word provided by said matrix array for applying a control signal to one of the output lines thereof.

5. A combination as in claim 4 further including means for sequentially enabling selected ones of the additional plurality of translators.

6. A combination as in claim 5 further including data and logic circuits connected to the output lines of said additional plurality of translators.

7. A combination as in claim 6 further including means for applying to at least one of said first-mentioned plurality of translators conditional signals indicative of information representations contained in said data and logic circuits.

8. A multiple function translator comprising a plurality of cross-point units,
means responsive to an input binary code word for selecting a particular one of said units,
means for applying steady-state signals and timing signals to said selecting means, and
means for applying each of successive instruction signals simultaneously to respective selected sets of plural units whereby the respective units of each set in turn are controlled to provide sequential output signals in response to each different one of said successively applied instruction signals.

9. In combination in a translator,
first and second pretranslators each including a plurality of lines emanating therefrom, each of the lines from said first pretranslator being disposed in an orthogonal relationship with respect to each of the lines from said second pretranslator thereby to define a multiplicity of intersections, a multiplicity of cross-point units respectively connected to the lines defining each of said intersections, means for applying periodic clock and steady-state reference signals to said first and second pretranslators, and means for applying instruction signals directly to selected ones of said cross-point units.

10. A combination as in claim 9 further including means for applying conditional logic signals directly to said selected cross-point units.

11. A combination as in claim 10 further including error control circuitry connected to said cross-point units for detecting the occurrence of double outputs therefrom.